Figure 13:
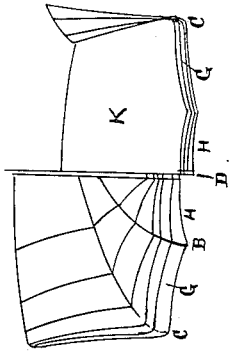

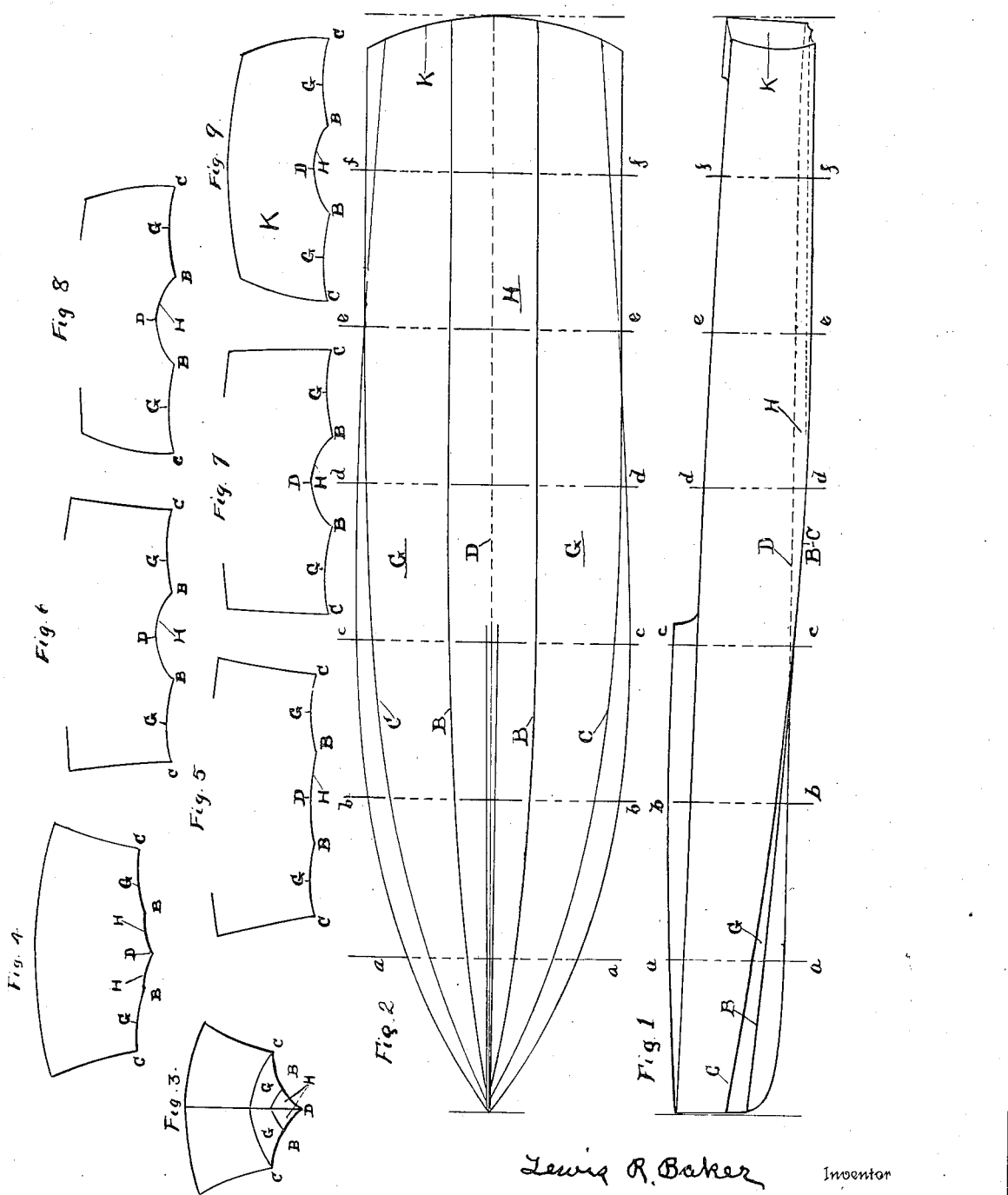

L. R. BAKER.
BOAT.
APPLICATION FILED DEC. 1, 1915.

1,189,227.

Patented July 4, 1916.
2 SHEETS—SHEET 2.

Inventor
Lewis R. Baker
By
William W. Varney, Attorney

UNITED STATES PATENT OFFICE.

LEWIS R. BAKER, OF BALTIMORE, MARYLAND.

BOAT.

1,189,227.  Specification of Letters Patent.  Patented July 4, 1916.

Application filed December 1, 1915. Serial No. 64,424.

*To all whom it may concern:*

Be it known that I, LEWIS R. BAKER, a citizen of the United States, and resident of Baltimore city and State of Maryland, have invented a new and useful Improvement in Boats, of which the following is a specification.

My invention relates to high speed water craft, technically known as hydroplanes or hydro-aeroplane hulls or boats where at speed the forward part of the hull rises above the water and the boat assumes a planing position.

The object of my invention is to reduce friction between the hull and the water.

A further object of my invention is to secure improved stability.

A further object of my invention is to provide a construction where high speeds may be obtained with a less horse power.

A further object of my invention is the construction of an improved rough sea speed boat.

With the foregoing and other objects in view my invention consists of the novel construction, combination, and arrangement of parts as herein specifically described and illustrated in the drawings wherein is shown the preferred embodiment of my invention, but it is understood that changes variations and modifications can be resorted to which come within the scope of the claims hereunto appended.

Figure 10:
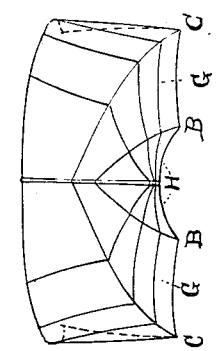
Figure 12:
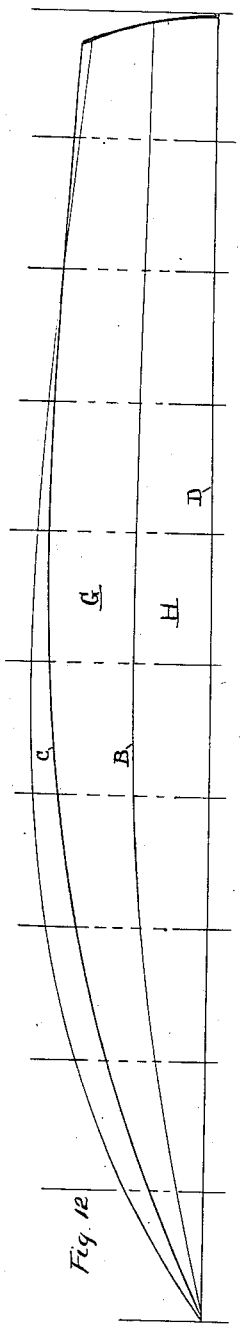
Figure 11:
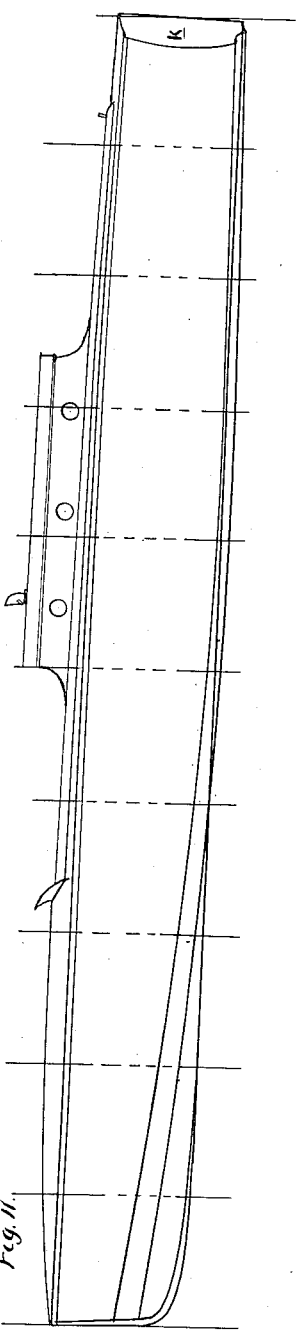

In the drawings of the herein described embodiment of my invention: Figure 1 shows a sheer plan or plan in elevation of a boat embracing my invention; Fig. 2 is a double half breadth plan or a bottom plan of that shown in Fig. 1; Fig. 3 is a sectional view taken through "*a a*" of Figs. 1 and 2; Fig. 4 is a sectional view taken through "*b b*" of Figs. 1 and 2; Fig. 5 is a sectional view taken through "*c c*" of Figs. 1 and 2; Fig. 6 is a sectional view through "*d d*" of Figs. 1 and 2; Fig. 7 is a sectional view taken through "*e e*" of Figs. 1 and 2; Fig. 8 is a sectional view taken through "*f f*" of Figs. 1 and 2; Fig. 9 is the transom end view; Fig. 10 is a body plan of the fore body; Fig. 11 shows a sheer plan or plan in elevation of a modified form of a larger type such as hydroplane cruisers; Fig. 12 is a half breadth or half bottom plan of that shown in Fig. 11 and Fig. 13 is a body plan of the modified construction shown in Figs. 11 and 12.

Similar numerals and letters refer to similar parts throughout its several views.

The hull of my invention is of the wave and air collecting type having two broad planing runners having concave or inverted V bottoms. A planing runner is on each outer edge of the boat as shown by letter G. The planing runners are parallel or nearly parallel with the keel line D and between the planing runners G is a concave or inverted V shaped channel H which assumes a V shape as it approaches the stem.

The longitudinals B forming the outer edges of the channel H and the inner edge of the planing runners G start at the stem a short distance above the keel D and extend in a gradual downward incline to below the keel D between sections "*b b*" and "*d d*" and there gradually assume a position nearly parallel to the keel D until they terminate at the transom K. The longitudinals C forming the outer edges of the planing runners G start at the stem a short distance above inner or channel longitudinals B and extend downward in a gradual incline until they have assumed the same or nearly the same angle as the inner edge of the planing runners as shown in Fig. 1 lettered at B and C. The planing runners G between the inner and outer longitudinals have a suitable concave form. These sections are continued in a concave shape to the stem. The inner and outer edges of the concave runners starting at the stem form a spiral shaped air duct which as it nears the planing point gradually assumes a horizontal position and continues horizontal or nearly so until it terminates at the transom K thus forming two air passages one for each planing runner. By this construction as the boat is propelled, a volume of air is forced and guided directly under the planing runners and the faster the boat is propelled a greater volume of air is forced under the planing runners and channel reducing the friction between the hull and water and by the general construction the hull at high speeds travels on the planing runners alone and with the keel and top of the channel above the surface of the water.

The forcing of air under the planing runners and channel I have accomplished by the formation of the longitudinals bounding the planing runners and channel and have used no mechanical device other than speed of boat to force the air under the hull.

The width of the planing runners is determined by calculation to displace the hull and all weights the hull is designed to carry at speeds. The widths of the channel or the distance the planing runners are apart need only to be sufficient to displace the weights of hull and all weights the hull is designed to carry at low speed, or at rest at a normal draft and to assure stability.

I have not restricted myself to the use of the sharp planing runner edges B and C but in some designs as shown in the modified form of Figs. 11, 12 and 13 curved sections to start at transom K and gradually assume the sharper edges as these longitudinals near the stem may be in some cases desirable.

In these specifications and claims I have used the terms concave as synonymous to inverted V and do not intend to be limited to the degree or character of curvature.

Having thus described my invention, what I claim and desire to secure by Letters Patent is:

1. A hydroplane hull with the planing runners joined rigidly by a concave shaped channel to a point from approximately midship rearward.

2. A hydroplane hull having two concave shaped air confining runners on each side of a concave channel.

3. A hydroplane hull having a concave shaped channel the center or keel line of which is above the planing runners from stern or transom to a point approximately midship.

4. A hydroplane hull having a concave shaped channel the center or keel line of which is above the planing runners from stern or transom to a point approximately midship and gradually assumes a V shape to the stem.

5. A hydroplane hull having longitudinals starting at the stem above the keel and bounding separate spiral shaped air ducts guiding the air to a channel between a pair of planing runners on the outer side of a channel.

LEWIS R. BAKER.

Witnesses:
D. Francis Clarke,
Howard A. Sweeden.